Oct. 23, 1962 M. COZZOLI 3,059,592
CARGO-HANDLING SYSTEM
Filed Sept. 6, 1956 4 Sheets-Sheet 1
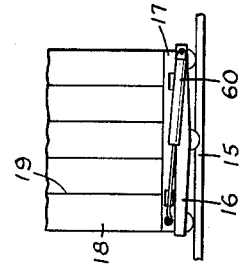
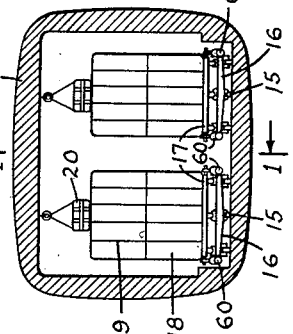
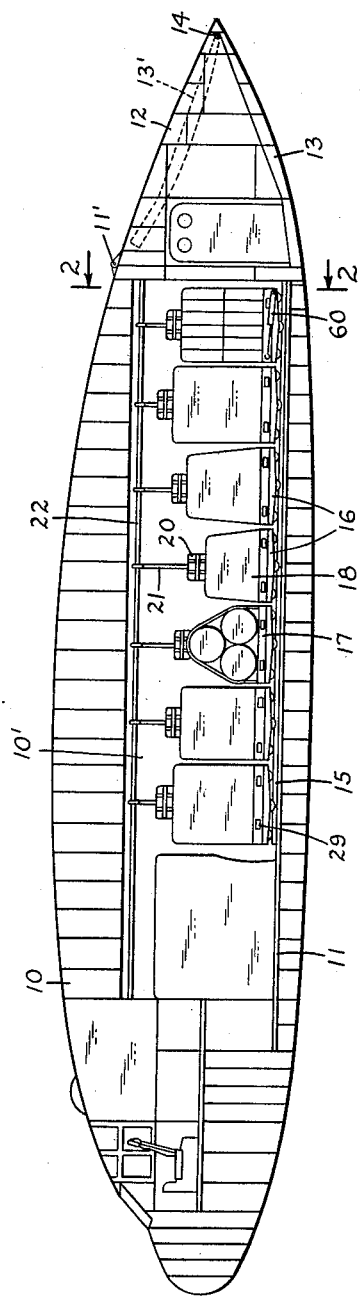
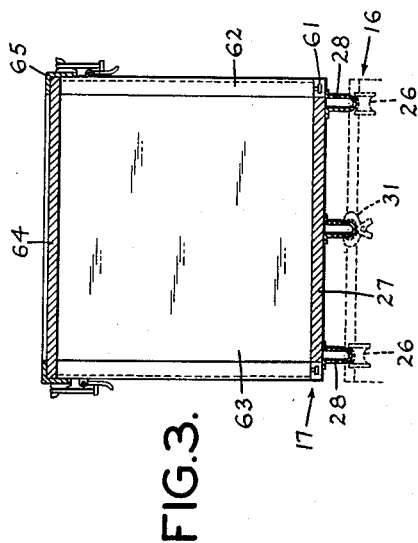
INVENTOR
MICHAEL COZZOLI
BY Campbell, Brumbaugh,
Free + Graves
HIS ATTORNEYS Oct. 23, 1962　　　　M. COZZOLI　　　　3,059,592
CARGO-HANDLING SYSTEM Filed Sept. 6, 1956　　　　4 Sheets-Sheet 2

INVENTOR
MICHAEL COZZOLI
BY Campbell, Brumbaugh,
Free & Graves
HIS ATTORNEYS

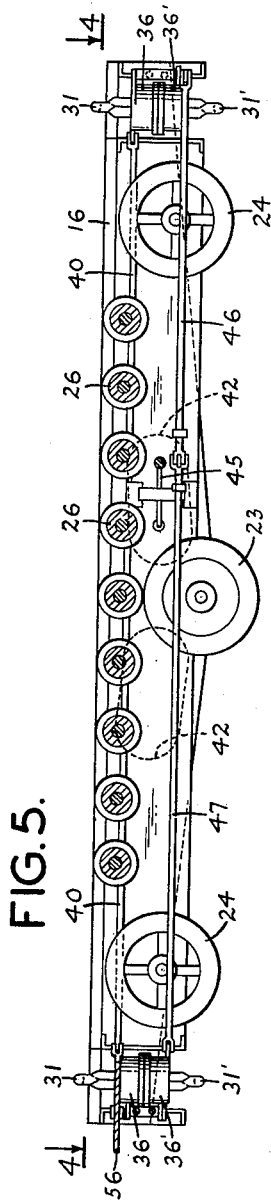
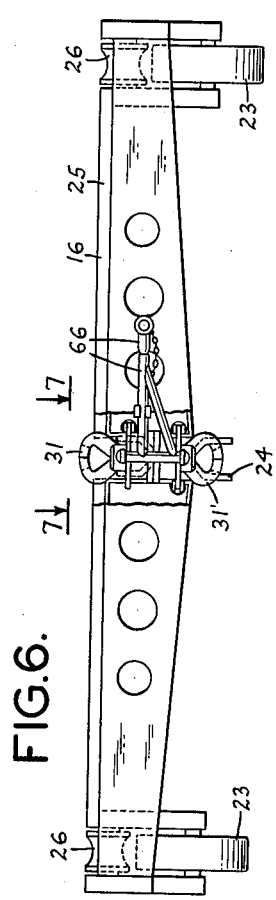
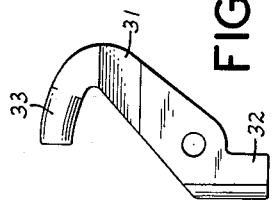
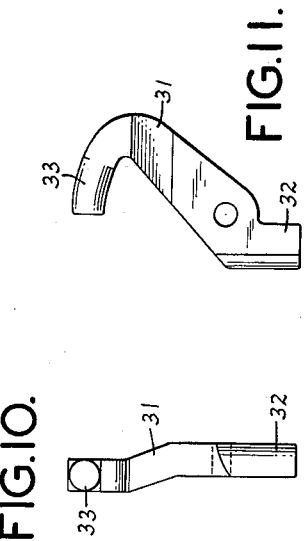
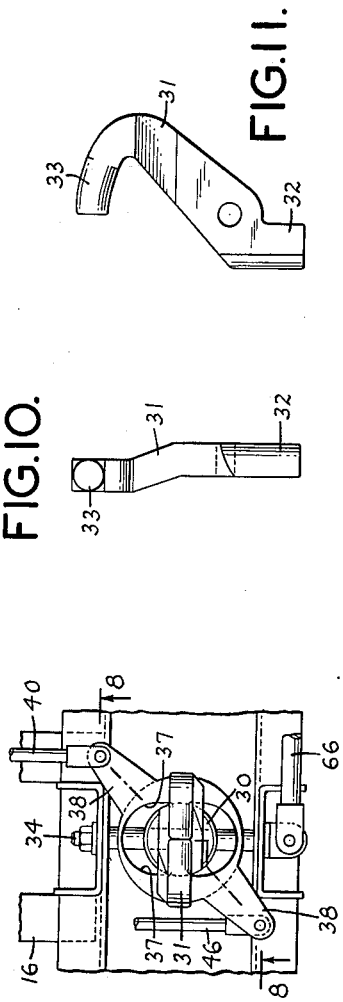

Oct. 23, 1962 M. COZZOLI 3,059,592
CARGO-HANDLING SYSTEM
Filed Sept. 6, 1956 4 Sheets-Sheet 4
FIG.8.
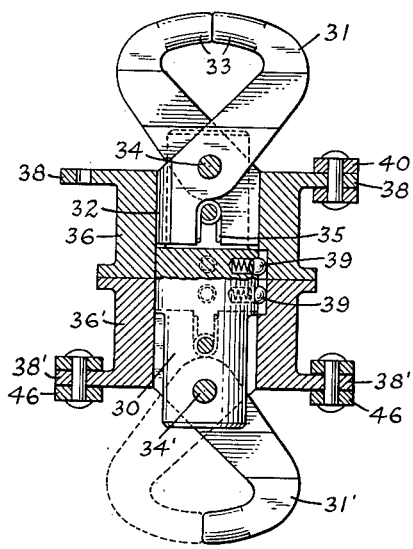
FIG.9.
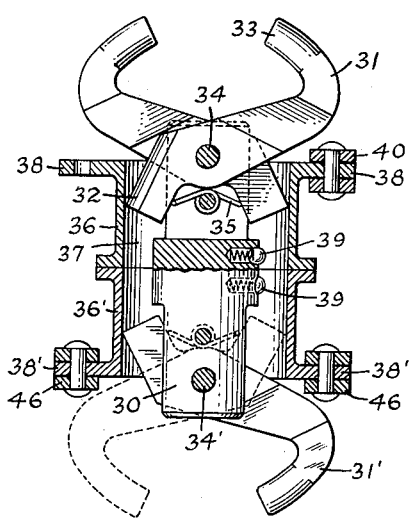
FIG.12.
FIG.13.
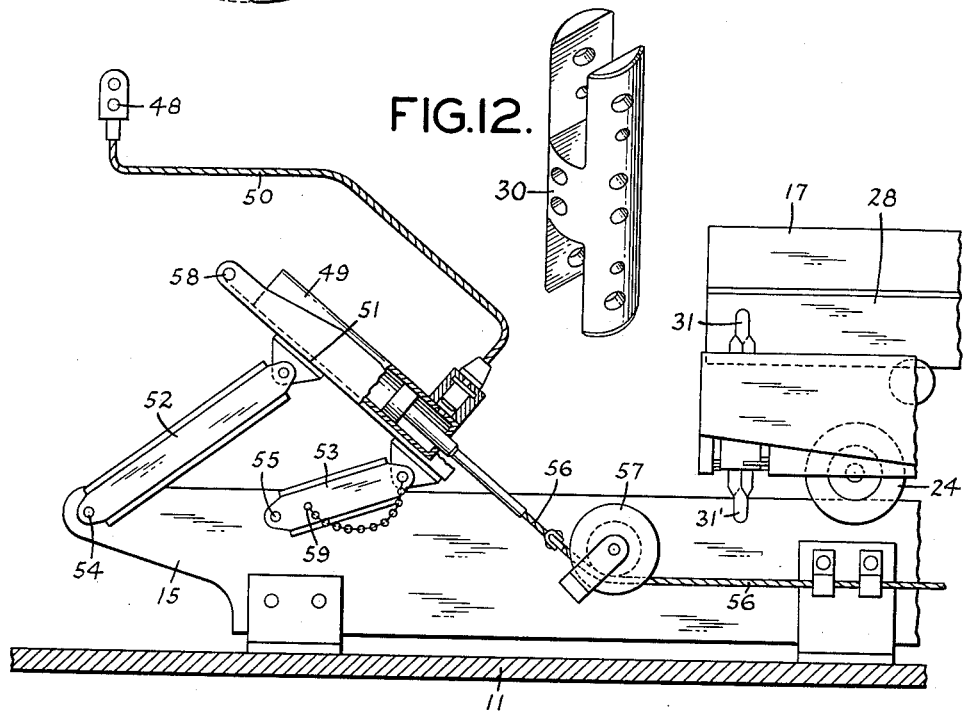
INVENTOR
MICHAEL COZZOLI
BY Campbell, Brumbaugh,
Free + Graves
HIS ATTORNEYS

United States Patent Office 3,059,592
Patented Oct. 23, 1962

3,059,592
CARGO-HANDLING SYSTEM
Michael Cozzoli, Hagerstown, Md., assignor to Fairchild Stratos Corporation, a corporation of Maryland
Filed Sept. 6, 1956, Ser. No. 608,343
7 Claims. (Cl. 105—366)

This invention relates to apparatus for handling removable cargo in any type of carrier, and particularly to cargo-handling apparatus for aircraft.

The primary object of this invention is to provide apparatus whereby cargo may be transported from one place to another by any suitable carrier or combination of carriers, in a very simple and inexpensive manner. The apparatus is adaptable to nearly every contingency which may be presented by modern logistic problems.

More specifically, the system of devices of this invention is designed to reduce the time consumed in handling and loading operations and at the same time to utilize inexpensive and therefore relatively expendable handling equipment during the storage period and delivery operation. The system is particularly adapted for use in supplying troops with supplies and equipment and may be installed in trucks, ships, railroad cars or airplanes to provide the desirable feature of interchangeability from one means of transport to another.

The cargo-handling system of the present invention comprises a novel wheeled conveying truck having at least two spaced roller tracks for supporting a pallet on the truck platform. The pallet is of conventional design and has at least two rails on the bottom thereof, spaced apart so as to engage and support the pallet on the roller tracks mounted on the truck platform.

Stationary guides are provided on the floor of the conveying vehicle, such as an airplane fuselage, adapted to cooperate with a truck for guiding the truck in and out of the vehicle and for cooperation with locking means to hold the same in place during movement of the airplane or other conveying vehicle.

It will be seen that in accordance with the invention cargo-bearing pallets may be loaded and stored or transported in the usual manner. For facilitating movement within the warehouse and for loading and unloading, the pallets may be placed on the wheeled truck and locked thereto. Several handlings can be saved by rolling the truck with attached pallet and cargo onto a conveying vehicle such as an airplane, locking the truck in place and following the reverse procedure at the point of destination. Transfer of the pallet bearing truck from one vehicle to another is also simplified, e.g. from an airplane to a surface vehicle and vice versa.

A more detailed description of the cargo-handling apparatus of this invention, together with other objects and attendant advantages, will appear from the following detailed description of the attached drawings, in which:

FIGURE 1 is a vertical section through the fuselage of a cargo airplane as seen along the line 1—1 of FIGURE 2 and embodying the cargo-handling apparatus of this invention;

FIGURE 2 is an enlarged section of FIGURE 1 as seen along the line 2—2 thereof;

FIGURE 3 is a transverse section through one form of pallet for use in the cargo-handling system of this invention;

FIGURE 5 is a vertical section of the truck shown in FIGURE 4, as seen along the line 5—5 thereof;

FIGURE 6 is an end elevation of the apparatus of FIGURE 4, as seen, along the line 6—6 thereof;

FIGURE 7 is an enlarged plan view of a device for locking the pallet to the truck as seen along the line 7—7 of FIGURE 6;

FIGURE 8 is a horizontal section of the locking device shown in FIGURE 7, as seen along the line 8—8 thereof;

FIGURE 9 illustrates the open position of the locking device of FIGURE 8;

FIGURES 10 and 11 are respective side and front elevations of the hook element of the locking device;

FIGURE 12 shows in perspective the bifurcated post element of the locking device;

FIGURE 13 is a side view, partly schematic, showing the lock-releasing mechanism of the present invention; and FIGURE 14 is an enlarged view of a portion of FIGURE 1, illustrating a preferred form of ejecting means.

Figure 4:
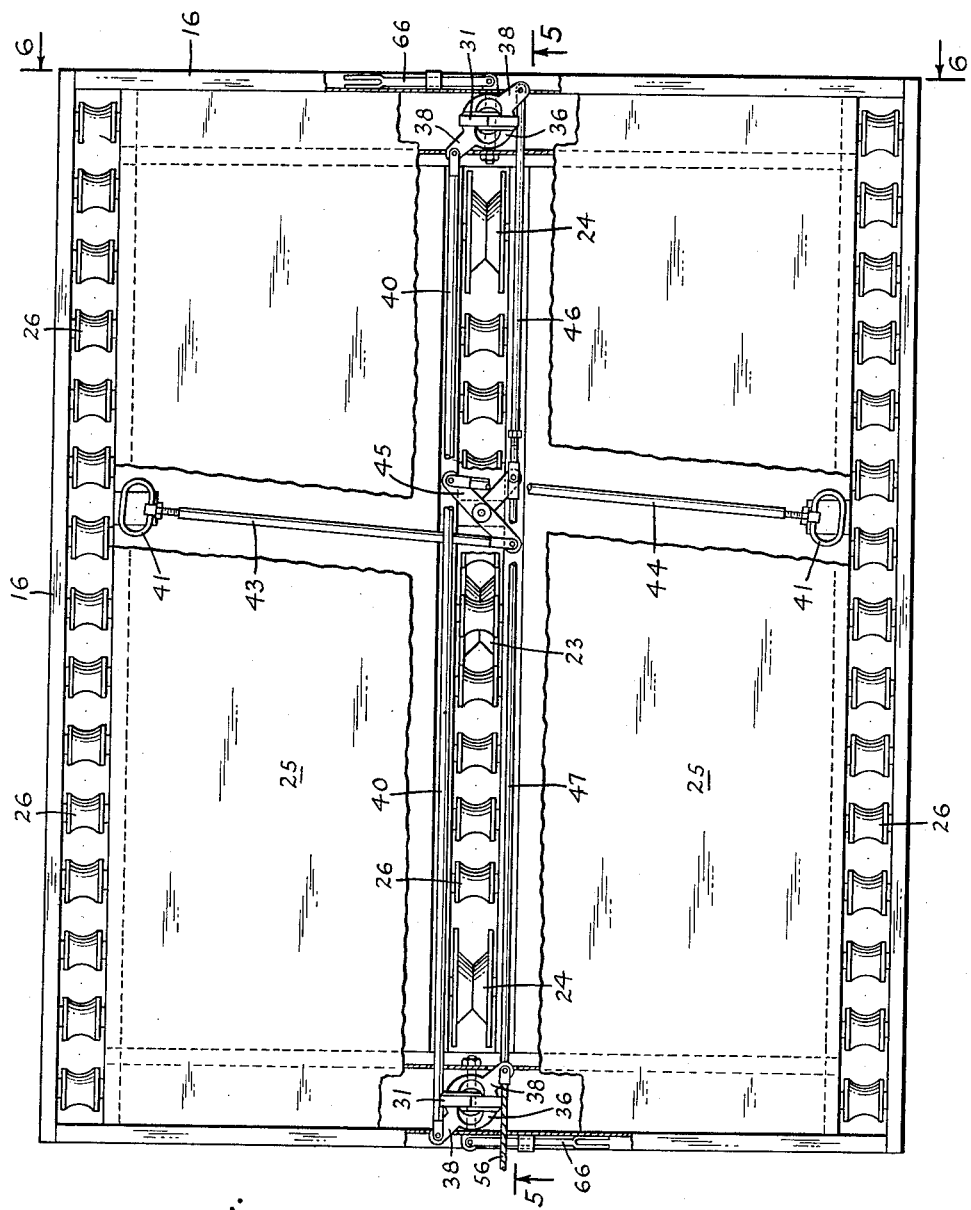
FIGURE 4 is a plan view of a pallet-bearing truck of this invention as seen along the line 4—4 of FIGURE 5 with portions thereof shown as broken away.

While the preferred embodiment of the present invention will be described and illustrated in reference to its use in aircraft, it is understood that the cargo-handling apparatus is readily adaptable for installation in any other desired means of transportation.

The conveying vehicle may be an airplane and FIGURES 1 and 2 show the fuselage 10 thereof having a floor 11 and its tail portion 12 hinged at 11' to open upwardly and outwardly, for loading and unloading access to the cargo hold 10' of the airplane. The lower panel 13 of the tail portion 12 is hinged at 14 to the aft end of the tail portion 12 and when opened to the position shown in dotted lines at 13', provides an opening through which cargo can be jettisoned during an air drop.

The cargo-handling apparatus of this invention is shown in position within the cargo hold 10'. Two or more stationary guides 15 (two being shown) are in parallel relation longitudinally mounted on the floor 11 of the fuselage 10 and comprise plates arranged in a vertical plane, as is shown in greater detail in FIGURE 13 to be described.

A plurality of conveying trucks 16 are arranged on each of the stationary guides 15 and a pallet 17, bearing cargo 18, is mounted on each truck 16. The cargo 18 is secured to each pallet by suitable sling means 19, such as straps or cordage, for example. In addition, each unit comprising a pallet 17 and its attached cargo 18 may be provided with a parachute 20, which is attached to the unit in any desired manner. The parachute rip cord 21 is connected to a conventional releasing device 22 mounted on the ceiling of the cargo hold 10', in the usual manner.

The truck 16, shown in detail in FIGURES 4, 5 and 6, is of beam type structure at the midpoint of which two ground wheels 23 are rotatably mounted. In addition, two grooved wheels 24 are rotatably mounted at a higher level than wheels 23 on the under side of the truck 16, one at the front center and the other at the rear center thereof. The grooves of the track-engaging wheels 24 are adapted to engage the stationary guides 15 in the manner shown in FIGURES 2 and 13.

The truck 16 is provided with a platform 25 having rollers 26, journalled thereon in parallel rows, forming roller tracks for supporting and guiding the pallet 17. At least two parallel rows of rollers 26 are required, and in the preferred form, three parallel rows are illustrated, one in the center and two at opposite edges, as shown in FIGURES 3, 4 and 6. The rollers 26 forming the tracks are recessed into the platform 25 so that no portion thereof extends above the surface of platform 25. With this arrangement, after the pallet 17 has been dropped or otherwise removed from the cargo hold 10', passage along the platform 25 by the crew or by paratroopers is unimpeded by projecting rollers and the like.

Referring now to FIGURE 3, the elementary pallet 17 comprises a load-bearing platform 27 fabricated of any suitable material such as plywood, sheet metal, or metal-clad plywood. At least two inverted U-shaped rails 28, and preferably three, are attached to the under side of the pallet 17 as shown and are spaced apart so as to engage the tracks of rollers 26 on truck 16 for guiding the pallet over the surface thereof.

The lateral spacing between rails 28 as shown in FIGURE 3 allows the fork of a lift truck to engage the pallet 17 from either end, and suitably spaced openings 29 are provided in rails 28, as shown in FIGURE 1, for the insertion of a lift truck fork from either side, so that the pallet 17 may be handled from all sides, thus facilitating handling and transfer of the pallet 17 in warehouses, depots, etc.

An important feature of the cargo-handling system of the present invention is the combination of means for locking the truck 16 to the stationary guides 15, with independently-operated means for locking the pallet 17 to the truck 16.

Referring to FIGURES 7 through 12, inclusive, means for locking the trucks 16 to the rails 15 comprises a cylindrical post 30 mounted vertically in the longitudinal center line of the truck 16 and bifurcated at each end to receive a pair of hooks 31, as shown in enlarged detail in FIGURES 8, 9 and 12. Hooks 31 have the configuration shown in FIGURES 10 and 11 and each comprises a heel portion 32 and a hook extension 33. A pair of hooks 31 is pivoted within the upper bifurcated portion of the post 30 about a bolt 34, which extends through a portion of the frame of the truck 16, as shown in FIGURE 7, thus providing means for attaching the locking means to the truck 16 and at the same time providing a shaft about which the hooks 31 may be pivoted. A similar pair of hooks 31' is pivoted within the lower bifurcated portion of post 30 about the bolt 34' which also extends through a portion of the frame of the truck 16.

Springs 35 are carried by the post 30 and engage the inner surfaces of the heels 32 of each pair of hooks 31 and 31' so as to normally urge the hooks 31 and 31' toward open position. Each locking means comprises upper and lower pairs of hooks 31 and 31', the upper pair 31 being adapted to engage the center rail 28 of the pallet 17 and the lower pair 31' being adapted to engage the stationary guide means 15, both of these functions being illustrated in FIGURE 13.

Preferably one such set of upper and lower locking hooks 31 and 31' is mounted at each end of the truck 16 as shown in FIGURES 4 and 5. The hook-carrying posts 30 are seated in axially aligned upper and lower locking collars 36 and 36', respectively. Each locking collar 36 and 36' has two opposed cam surfaces 37, forming a substantially elliptical shaped opening in the corresponding collars 36 and 36', as shown in FIGURE 7. Each collar 36, 36' is rotatably mounted on the post 30, so as to allow the heels 32 to follow the elliptical curvature of the cam surfaces 37 under the pressure of springs 35. In their closed position, shown in FIGURE 8, the hook elements 31 lie in the plane of the minor axis of the elliptical opening, and in their open position they lie in the plane of the major axis, as shown in FIGURE 7.

The hooks 31, 31' are prevented from being operated by spring 35, since the heels 32 of each hook element 31, 31' abut the corresponding cam surface 37 of the collar as shown in FIGURE 8, whereas in the position shown in FIGURE 9 the spring 35 holds the hooks 31 in open position. Thus, rotation of the collar 36 or 36' through 90 degrees or ¼ turn correspondingly places the hooks 31, 31' in the plane of the major axis of the elliptical opening of the collar and allows the hooks 31 or 31' to open in response to the pressure of spring 35. Reverse rotation through ¼ turn causes the cam surface 37 to force heels 32 together and thus close hooks 31, 31'. Spring-pressed ball-type detents 39, here shown in two positions, assist in retaining the collar members 36, 36' in either the closed or open position.

The collars 36, 36' are independently journalled on the truck 16, one vertically aligned pair 36, 36' at each end of the truck center line. The upper collar 36 is fitted with lateral arms 38 on the outer ends of one of which is pivoted a suitable push-pull rod 40 which is also pivoted to the other upper collar 36, as shown in FIGURE 4. Actuation of one upper collar means 36 by rod 40 will thus actuate both. The system described is designed for manual operation but may be power-operated, e.g. by a manually controlled servo-system.

The lower lock collars 36', which control the hooks locking the truck 16 to the stationary guides 15, are actuated from either side of the truck 16 by pulling or pushing the hand rings 41 (FIG. 4), which are accessible through the hand holes 42 in each side of the truck 16, as shown in FIGURE 5.

The hand rings 41 operate push-pull rods 43 and 44, rotating a bell-crank assembly 45, joined to an arm 38' of one of the lower collar means 36' by connecting rod 46 and to the arm 38' of the other lower collar 36' by connecting rod 47. In this manner, the lower locking means at each end of the truck 16 are operated in unison but independently of the corresponding upper locking means, so that the pallet 17 may be released from its truck 16 without releasing the latter, and vice versa.

For purposes of aerial delivery, means may be provided for unlocking each pallet 17 individually from its truck 16. Where all of the cargo is to be dropped at one time, it may be convenient to provide only a means for unlocking the pallet 17 closest to the exit hatch 13 and at the same time provide means for automatically unlocking the remainder of the pallets 17 by means responsive to the dropping of the first pallet 17.

A remote control means for unlocking the first pallet 17 of a series is shown in FIGURE 13 where a portable switch box 48 is connected to an electrically-fired explosive cartridge actuator 49 by wires 50. The actuator 49 is mounted on a base member 51, supported at the end of the stationary guide 15 by links 52 and 53 which pivot about respective mounting bolts 54 and 55 to allow the actuator 49 and base member 51 to swing upward and forward. The actuator 49 is attached to a cable 56 passing under pulley 57 journalled on guide 15 to an arm 38' of the nearest upper locking collar 36 of the first pallet 17 to be dropped. A pull handle 58 affords manual operation and a lock pin 59 is provided in link 53 to prevent accidental release of the mechanism.

In the operation of this release mechanism, the pilot normally closes the switch on portable switch box 48 to energize the actuator 49 which pulls the cable 56 to rotate upper collar 36 and thus open hooks 31 to release the first pallet 17 from its truck 16, whereupon the pallet 17 rolls along rollers 26 to be discharged from its truck 16 and fall from the airplane.

According to a usual practice, all of the pallets 17 may be connected together by "daisy chains" which are normally webbing straps of fabric, although other suitable rope or cordage may be employed. The "daisy chain" may be arranged to open the hooks 31 and thus unlock each subsequent pallet 17 in the series to be dropped. At the same time the "daisy chain" series connection between the pallets 17 serves to pull each succeeding loaded pallet 17 from the airplane. The usual use of the "daisy chain" is to link together all of the units to be dropped to prevent excessive scattering of the units upon reaching the ground.

The usual practice when dropping aerial cargo involves the reduction in the speed of the airplane by raising the nose thereof. This inclines the floor of the airplane and causes the cargo to tend to roll rearwardly by gravity. However, to provide for the occasion where such tilting of the plane and floor would not be feasible or advisable, it is contemplated that an ejecting means may be used to insure that the first pallet 17 be ejeced as soon as it is unlocked. The means used for the purpose consists of a pair of catapult devices 60 attached to the truck 16 and its pallet 17 as shown in FIGURE 1, and may take any one of several forms. For example, it may comprise a piston and cylinder arrangement actuated by either compressed air, hydraulic fluid pressure or an explosive cartridge device, or it may also take the form of a simple, stretched, coil spring. The preferred arrangement employs an explosive cartridge device, as shown in FIGURE 14. The catapult device 60 is attached at one end to the end of the truck 16 nearest the exit hatch 13 and at its other end to the opposite end of the pallet 17. The catapult 60 is anchored to the truck 16 to be retained thereby after ejection of the pallet 17 and is, of course, releasably hooked to the pallet 17 to provide automatic disengagement therefrom when the pallet has been ejected.

In a similar manner, the lower locking means may be released independently of the upper locking means by pulling on hand rings 41 to disengage the trucks 16 with or without pallet 17 from the guides 15 by rotating lower collars 36′ to thereby open hooks 31′ and disengage guides 15.

Although the pallet 17 described herein, flat or base, has been of the type suitable for tying down large multipart box-like articles of cargo, pallet 17′, shown in FIGURE 3, has been found useful in carrying large quantities of small items. In this modification, key-hole slots 61 are cut at the four corners of the pallet and are adapted to receive corner posts 62. Four sides 63 and top 64 of light weight material are added and an angle frame 65 is added after the box pallet 17′ is filled with articles. A convention sling 19 encircles the box pallet 17′ to retain the top 64 in place.

As an additional modification, a hitch or tow fitting 66 is provided at the front and rear of each truck 16 to allow training of a number of trucks 16, if desired.

It will be understood that the above-described embodiment of the invention is illustrative only and that modifications will occur to those skilled in the art. Therefore, the invention is not to be limited to the specific apparatus disclosed herein but is to be defined by the appended claims.

I claim:

1. In a cargo-handling system the combination of a cargo-carrying vehicle having a deck, a conveying truck, recessed roller track means mounted on the upper surface of said truck, a cargo pallet supported on said truck by said roller track means and guided thereby for movement relative to said truck, means for locking said pallet against movement relative to said truck, stationary guide means on the deck of said vehicle adapted to cooperate with said truck for guiding the truck during movement thereof on and off said vehicle, means for locking said truck against movement relative to said guide means, and means for releasing said pallet locking means to permit movement of the pallet relative to the truck.

2. The combination according to claim 1, in which said releasing means comprises a power operated pulling mechanism, a member connecting said pulling mechanism with said pallet locking means, and manually operated remote control means operatively connected with said pulling mechanism.

3. The combination according to claim 2, including means mounting said pulling mechanism on said cargo-carrying vehicle for movement in the pulling direction of said pulling mechanism, and a handle for manually actuating said pulling mechanism in said pulling direction.

4. The combination according to claim 3, in which said mounting means comprises a stationary anchorage, and links connecting said pulling mechanism with said stationary anchorage.

5. In a cargo-handling system the combination of a cargo-carrying vehicle having a deck, a conveying truck, recessed roller track means mounted on said truck, a cargo pallet supported on the upper surface of said roller track means for movement relative to said truck, means for locking said pallet against movement relative to said truck, stationary guide means on the deck of said vehicle adapted to cooperate with said truck for guiding the truck during movement thereof on and off said vehicle, means for locking said truck against movement relative to said guide means, remotely controlled means for releasing said pallet locking means, and ejecting means between said truck and said pallet supported thereby, said ejecting means being adapted to create relative movement between the truck and the pallet.

6. In combination with an aircraft, a cargo deck, a truck movably supported on said deck, means for locking said truck to said deck, a pallet supported on said truck, means for locking said pallet on said truck, mechanism for releasing each of said locking means, and manually operable means for alternatively operating each of said locking means.

7. A cargo vehicle according to claim 6, in which each locking means comprises a common post, a pair of cam-shaped collars axially rotatable on said post, a pair of hooks pivoted at each end of said post and on said truck, and engaging the cams of said collars, spring means normally urging said hooks toward open position, and means for rotating said collars on said post to cause said cams to close said hooks against the pressure of said corresponding spring.

References Cited in the file of this patent

UNITED STATES PATENTS

| | | |
|---|---|---|
| 426,385 | Jones | Apr. 22, 1890 |
| 1,132,960 | Moreland | Mar. 28, 1915 |
| 1,276,674 | Mentzer et al. | Aug. 20, 1918 |
| 1,578,024 | Greenleaf | Mar. 23, 1926 |
| 1,605,901 | O'Neil | Nov. 2, 1926 |
| 1,693,607 | Kellett | Dec. 4, 1928 |
| 1,797,601 | Barr | Mar. 24, 1931 |
| 1,923,785 | Holand | Aug. 22, 1933 |
| 1,989,920 | Fildes | Feb. 5, 1935 |
| 2,061,083 | Niemi | Nov. 17, 1936 |
| 2,065,573 | Frede | Dec. 29, 1936 |
| 2,099,288 | Allen | Nov. 16, 1937 |
| 2,123,424 | Kellett | July 12, 1938 |
| 2,334,124 | Peterson | Nov. 9, 1943 |
| 2,388,380 | Bathurst | Nov. 6, 1945 |
| 2,404,195 | Schliben | July 16, 1946 |
| 2,441,913 | Taylor | May 18, 1948 |
| 2,444,297 | Kellett | June 29, 1948 |
| 2,573,496 | Runkle | Oct. 30, 1951 |
| 2,605,064 | Davis | July 29, 1952 |
| 2,625,118 | Lechner | Jan. 13, 1953 |
| 2,654,632 | Herbert | Oct. 6, 1953 |
| 2,691,450 | Rosenbaum | Oct. 12, 1954 |
| 2,699,735 | Williams | Jan. 18, 1955 |
| 2,715,012 | Huber | Aug. 9, 1955 |
| 2,715,971 | Cox | Aug. 23, 1955 |
| 2,764,374 | Anderson et al. | Sept. 25, 1956 |
| 2,774,560 | Johnson | Dec. 18, 1956 |
| 2,781,002 | Talboys | Feb. 12, 1957 |
| 2,813,642 | Fisher | Nov. 19, 1957 |
| 2,858,774 | Batten | Nov. 4, 1958 |

UNITED STATES PATENT OFFICE
CERTIFICATE OF CORRECTION

Patent No. 3,059,592

October 23, 1962

Michael Cozzoli

It is hereby certified that error appears in the above numbered patent requiring correction and that the said Letters Patent should read as corrected below.

Column 6, line 8, strike out "the upper surface of" and insert the same after "on" in line 7, same column 6.

Signed and sealed this 7th day of May 1963.

(SEAL)
Attest:

ERNEST W. SWIDER
Attesting Officer

DAVID L. LADD
Commissioner of Patents